(12) United States Patent
Jung et al.

(10) Patent No.: US 9,137,840 B2
(45) Date of Patent: Sep. 15, 2015

(54) METHOD FOR MANAGING COMPONENT CARRIER SETTING INFORMATION AND A DEVICE FOR THE SAME

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 216 days.

(21) Appl. No.: 13/520,786

(22) PCT Filed: Jan. 6, 2011

(86) PCT No.: PCT/KR2011/000089
§ 371 (c)(1),
(2), (4) Date: Jul. 5, 2012

(87) PCT Pub. No.: WO2011/083991
PCT Pub. Date: Jul. 14, 2011

(65) Prior Publication Data
US 2012/0281655 A1    Nov. 8, 2012

Related U.S. Application Data

(60) Provisional application No. 61/293,185, filed on Jan. 7, 2010.

(51) Int. Cl.
*H04W 76/04* (2009.01)
*H04W 24/10* (2009.01)
(Continued)

(52) U.S. Cl.
CPC ............... *H04W 76/04* (2013.01); *H04L 5/001* (2013.01); *H04W 24/10* (2013.01); *H04W 76/064* (2013.01)

(58) Field of Classification Search
CPC ............ H04W 76/064; H04W 76/066; H04W 76/068; H04L 5/001

USPC .......................... 370/329, 328, 330, 436, 437
See application file for complete search history.

(56) References Cited

U.S. PATENT DOCUMENTS 7,596,379 B2 * 9/2009 Farnsworth et al. .......... 455/450
8,280,377 B2 * 10/2012 Lee et al. ...................... 455/436
(Continued)

OTHER PUBLICATIONS

Huawei, "Component Carrier Management with DRX Consideration in LTE-Advanced" 3GPP TSG-RAN WG2 Meeting #66bis, Jun. 29-Jul. 3, 2009, sections 1-3.*
(Continued)

*Primary Examiner* — Joseph Bednash
(74) *Attorney, Agent, or Firm* — Lee, Hong, Degerman, Kang & Waimey

(57) ABSTRACT

The present invention relates to a method for managing component carrier setting information in component carrier addition/setting, and to a device for the same. Provided as a method for managing component carrier setting information and a device for the same, wherein the method comprises: a step in which a terminal receives a component carrier elimination command for a specific component carrier from a network; a step in which the terminal eliminates the specific component carrier from a component carrier list while the component carrier setting information for the specific component carrier is maintained following the receipt of the component carrier elimination command; a step in which the terminal receives a component carrier addition command for the specific component carrier from the network; and a step in which the terminal adds the specific component carrier to the component carrier list by referring to the component carrier setting information which was maintained following the receipt of the component carrier addition command.

10 Claims, 10 Drawing Sheets

(51) Int. Cl.
*H04L 5/00* (2006.01)
*H04W 76/06* (2009.01)

(56) References Cited

U.S. PATENT DOCUMENTS

| | | | |
|---|---|---|---|
| 2003/0007459 A1* | 1/2003 | Yi et al. | 370/252 |
| 2007/0004408 A1 | 1/2007 | Buckley et al. | |
| 2010/0238908 A1* | 9/2010 | Wu | 370/336 |
| 2011/0103243 A1* | 5/2011 | Larsson et al. | 370/252 |
| 2011/0105155 A1* | 5/2011 | Bienas et al. | 455/458 |
| 2011/0305213 A1* | 12/2011 | Lohr et al. | 370/329 |
| 2012/0008600 A1* | 1/2012 | Marinier et al. | 370/336 |
| 2012/0014257 A1* | 1/2012 | Ahluwalia et al. | 370/241 |
| 2013/0051214 A1* | 2/2013 | Fong et al. | 370/216 |

OTHER PUBLICATIONS

Nokia Corporation, Nokia Siemens Networks, "System Information Change in RRC_CONNECTED", 3GPP TSG-RAN WG2 Meeting #68, Jeju, Korea, Nov. 9-13, 2009, R2-096813.*

Nokia Corporation, Nokia Siemens Netwroks, "Basic CC configuration in Carrier Aggregation", 3GPP TSG-RAN WG2 Meeting #68, Jeju, Korea, Nov. 9-13, 2009, R2-096812.*

Ericsson, ST-Ericsson, "Component Carrier Management", 3GPP TSG-RAN WG2 #68, Jeju, Korea, Nov. 9-13, 2009, R2- 096756.*

InterDigital, "System Information Update for Carrier Aggregation", 3GPP TSG-RAN WG2, Jeju, Korea, Nov. 9-13, 2009, R2-096584.*

Catt, System Information Acquisition and Updating in Carrier Aggregation, 3GPP TSG-RAN WG2 #68, Jeju, Korea, Nov. 9-13, 2009, R2-096503.*

NEC, "Details on Carrier Aggregation Signaling", 3GPP TSG-RAN WG2 #67bis, Miyazaki, Japan, Oct. 12-16, 2009, R2-095950.*

Samsung, "The need for additional activation procedure in carrier aggregation", 3GPP TSG-RAN2 #67bis, Miyazaki, Japan, Oct. 12-16, 2009, R2-095784.*

Ericsson, ST-Ericsson, "Activation and deactivation of component carriers", 3GPP TSG-RAN WG2 #67bis, Miyazaki, Japan, Oct. 12-16, 2009, R2-095808.*

NEC, "Component carrier configuration/activation for carrier aggregation", 3GPP TSG-RAN2 Meeting #67bis, Miyazaki, Japan, Oct. 12-16, 2009, R2-095576.*

Huawei, "Component Carrier Management with DRX Consideration in LTE-Advanced", R2-093922, 3GPP TSG-RAN WG2 Meeting #66bis, Jun. 2009.

Ericsson et al., "Component Carrier Management", R2-096756, 3GPP TSG RAN WG2 Meeting #68, Nov. 2009.

* cited by examiner

METHOD FOR MANAGING COMPONENT CARRIER SETTING INFORMATION AND A DEVICE FOR THE SAME

CROSS-REFERENCE TO RELATED APPLICATIONS

This application is the National Stage filing under 35 U.S.C. 371 of International Application No. PCT/KR2011/000089, filed on Jan. 6, 2011, which claims the benefit of U.S. Provisional Application Ser. No. 61/293,185, filed on Jan. 7, 2010, the contents of which are all incorporated by reference herein in their entirety.

TECHNICAL FIELD

The present invention relates to a method of configuring component carriers, in which a network uses less radio resource for a user equipment capable of receiving a service via a plurality of component carriers.

BACKGROUND ART

In such a situation as a case that requirements (e.g., data rate, etc.) for a service quality of a user equipment are changed, a case that a communication channel quality of a user equipment is changed or a case that a user equipment is moving, if a network attempts to configure optimal component carriers for the user equipment capable of using a plurality of component carriers all the time, a component carrier addition/removal command for the user equipment may be frequently generated.

In order to additionally configure a component carrier for a user equipment capable of using a plurality of component carriers, a network should deliver all kinds of informations required for the component carrier configuration. Since component carrier configuration information consists of various kinds of informations, a sum of data becomes a serious matter. Thus, if the component carrier addition command is frequently generated, a size of a radio resource consumed for delivering the component carrier configuration information to the user equipment considerably increases to lower efficiency in radio resource use.

Meanwhile, as the requirements for a higher quality of service increase, a user equipment will tend to use a plurality of component carriers and the maximum number of component carriers configurable for a user equipment will increase as well. Hence, the component carrier configuration will occur more frequently. In this environment, the demand for a more efficient component carrier configuring or adding method is rising to increase efficiency in using radio resources.

DISCLOSURE OF THE INVENTION

Technical Task

In response to the above-mentioned demand, the present invention is directed to an efficient component carrier adding method that substantially obviates one or more problems due to limitations and disadvantages of the related art. First of all, an object of the present invention is to provide a method for a user equipment to store/manage component carrier configuration information and a user equipment device for the same.

Technical Solution

To achieve these and other advantages and in accordance with the purpose of the present invention, as embodied and broadly described, a method of managing component carrier (CC) configuration information, which is managed by a user equipment, according to one embodiment of the present invention may include the steps of receiving a component carrier removal command for a specific component carrier from a network, removing the specific component carrier from a component carrier list in response to a reception of the component carrier removal command while maintaining the component carrier configuration information on the specific component carrier, receiving a component carrier addition command for the specific component carrier from the network, and adding the specific component carrier to the component carrier list in consideration of the maintained component carrier configuration information in response to a reception of the component carrier addition command.

Preferably, the method may further include the steps of determining a presence or non-presence of validity of the stored component carrier configuration information, if the component carrier configuration information is valid, maintaining the component carrier configuration information, and if the component carrier configuration information is not valid, removing the component carrier configuration information. More preferably, the user equipment may determine the presence or non-presence of the validity of the component carrier configuration information by depending on whether a previously provided time expires. In particular, the previously provided time may include at least one of a time set for the user equipment and a time set by the network.

Preferably, the user equipment may add at least one component carrier to the component carrier list.

Preferably, the specific component carrier adding step may include the steps of if the component carrier addition command includes component carrier configuration information required for an operation of the specific component carrier, adding the specific component carrier in consideration of the component carrier configuration information included in the component carrier addition command, if the component carrier addition command does not include the component carrier configuration information required for the operation of the specific component carrier but the user equipment maintains the component carrier configuration information required for the operation of the specific component carrier, adding the specific component carrier in consideration of the component carrier configuration information required for the operation of the specific component carrier by being stored in the user equipment, and if the component carrier addition command does not include the component carrier configuration information required for the operation of the specific component carrier and the user equipment does not store the component carrier configuration information required for the operation of the specific component carrier, transmitting a request signal for the user equipment to request the component carrier configuration information required for the operation of the specific component carrier to the network.

To further achieve these and other advantages and in accordance with the purpose of the present invention, a user equipment, which manages component carrier (CC) configuration information, according to one embodiment of the present invention may include a receiving module configured to receive at least one of a component carrier removal command and a component carrier addition command for a specific component carrier from a network, a memory configured to store the component carrier configuration information on the specific component carrier, and a processor configured to control the receiving module and the memory, the processor, if receiving the component carrier removal command for the specific component carrier via the receiving module, removing the specific component carrier from a component carrier list while maintaining the component carrier configuration information on the specific component carrier, the processor, if receiving the component carrier addition command for the specific component carrier via the receiving module, adding the specific component carrier to the component carrier list in consideration of the maintained component carrier configuration information.

Preferably, the processor may determine a presence or non-presence of validity of the component carrier configuration information stored in the memory. In this case, if the component carrier configuration information is valid, the processor may maintain the component carrier configuration information. On the contrary, if the component carrier configuration information is not valid, the processor may remove the component carrier configuration information. More preferably, the processor may determine the presence or non-presence of the validity of the component carrier configuration information by depending on whether a previously provided time expires.

More preferably, the processor may receive the component carrier addition command for the specific component carrier via the receiving module. In this case, if the component carrier addition command includes component carrier configuration information required for an operation of the specific component carrier, the processor may add the specific component carrier in consideration of the component carrier configuration information included in the component carrier addition command. If the component carrier addition command does not include the component carrier configuration information required for the operation of the specific component carrier but the component carrier configuration information required for the operation of the specific component carrier is stored in the memory, the processor may add the specific component carrier in consideration of the component carrier configuration information required for the operation of the specific component carrier by being stored in the user equipment. Moreover, if the component carrier addition command does not include the component carrier configuration information required for the operation of the specific component carrier and the component carrier configuration information required for the operation of the specific component carrier is not stored in the memory, the processor may generate a request signal for requesting the component carrier configuration information required for the operation of the specific component carrier.

Advantageous Effects

According to the above-mentioned embodiments of the present invention, when a network attempts to configure (or add) component carrier for a user equipment, a required signaling load can be reduced.

MODE FOR INVENTION

Reference will now be made in detail to the preferred embodiments of the present invention, examples of which are illustrated in the accompanying drawings. The detailed description disclosed together with the accompanying drawings intends to explain exemplary embodiments of the present invention instead of representing a unique embodiment of the present invention. For instance, although the following descriptions are made in detail on the assumption that a mobile communication system includes 3GPP LTE based system, the following descriptions are variously applicable as a method for a user equipment to perform transmission-efficient measurement in various kinds of mobile communication systems such as IEEE 802.16 based systems and the like to which carrier aggregation technology is applicable.

The following detailed description of the invention includes details to help the full understanding of the present invention. Yet, it is apparent to those skilled in the art that the present invention can be implemented without these details. Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In the following description, as mentioned in the foregoing description, a method of managing a component carrier configuration information used for addition/configuration of component carrier and a user equipment device for the same are explained. To this end, 3GPP LTE system is schematically described as one example of a mobile communication system to apply this technology thereto.

Figure 1:
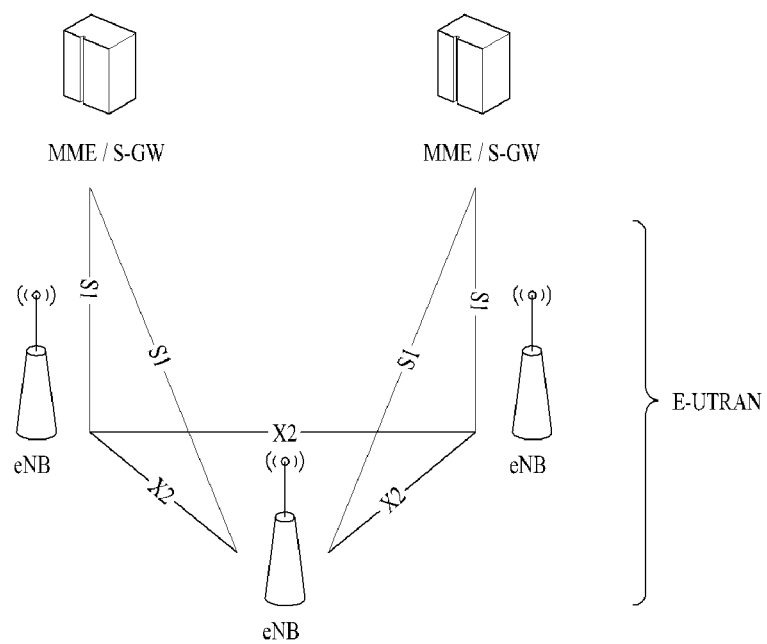
FIG. 1 is a diagram of a network structure of E-UTRAN (evolved universal terrestrial radio access network) for example of a mobile communication system.

FIG. 1 is a diagram of a network structure of E-UTRAN (evolved universal terrestrial radio access network) for example of a mobile communication system. E-UTRAN (evolved universal terrestrial radio access network) is the system evolved from the conventional UTRAN and its basic standardization is in progress by 3GPP. The E-UTRAN system is called LTE (long term evolution) system.

The E-UTRAN includes eNBs (e-NodeBs or base stations). The eNBs are connected to each other via X2 interface. The eNB is connected with a user equipment (hereinafter abbreviated UE) via wireless interface and is connected to EPC (evolved packet core) via S1 interface.

The EPC may include a mobility management entity (hereinafter abbreviated MME), a serving-gateway (hereinafter abbreviated S-GW), and a packet data network-gateway (hereinafter abbreviated PDN-GW). The MME has access information of the UE or information on capability of the UE. Such information is mainly used for the mobility management of the UE. The S-GW is a gateway having the E-UTRAN as a terminal end point. And, the PDN-GW is a gateway having the PDN as a terminal end point.

Layers of a radio interface protocol between a user equipment and a network may be divided into L1 ($1^{st}$ layer), L2 ($2^{nd}$ layer) and L3 ($3^{rd}$ layer) based on 3 lower layers of an open system interconnection (OSI) reference model widely known to the communication system. In these layers, a physical layer belonging to the $1^{st}$ layer provides an information transfer service using a physical channel and a radio resource control (hereinafter abbreviated RRC) situated in the $3^{rd}$ layer plays a role in controlling radio resources between the user equipment and the network. For this, the RRC layer plays a role in exchanging RRC message between a user equipment and a base station.

Figure 2:
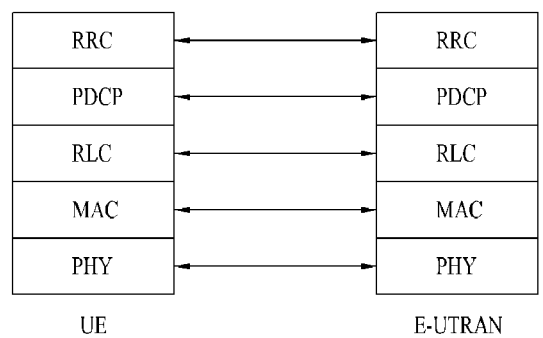
FIG. 2 and FIG. 3 are diagrams of structures of a radio interface protocol between UE (user equipment) and E-UTRAN based on 3GPP radio access network specifications.
Figure 3:
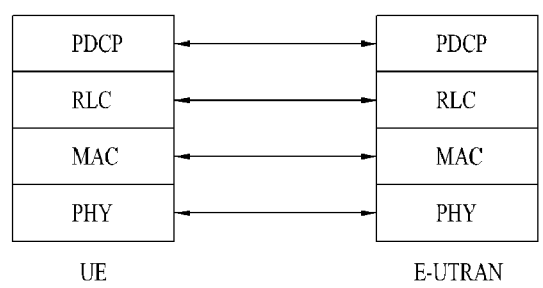

FIG. 2 and FIG. 3 show structures of a radio interface protocol between UE and E-UTRAN based on 3GPP radio access network specifications, respectively.

A radio interface protocol is horizontally constructed with a physical layer, a data link layer and a network layer. And, the radio interface protocol can be vertically divided into a user plane (hereinafter abbreviated U-plane) for a data information transfer and a control plane (hereinafter abbreviated C-plane) for a delivery of a control signal (i.e., signaling). The protocol layers shown in FIG. 2 or FIG. 3 can be divided into a first layer L1, a second layer L2 and a third layer L3 based on three lower layers of OSI (open system interconnection) reference model widely known to the communication systems. The radio protocol layers exist as pairs in UE and E-UTRAN and are responsible for the data transfer in a radio section.

In the following description, the layers of the radio protocol control plane shown in FIG. 2 and the layers of the radio protocol user plane shown in FIG. 3 are explained.

First of all, a physical layer of the first layer provides an information transfer service to an upper layer using a physical channel. The physical layer is connected to a medium access control (MAC) layer above the physical layer via a transport channel. And, data is transferred between the medium access control layer and the physical layer through the transport channel. Data is transferred between different physical layers, and more particularly, between a physical layer of a transmitting side and a physical layer of a receiving side. The physical layer is modulated by OFDM (orthogonal frequency division multiplexing) scheme and utilizes time and frequency as radio resources.

A medium access control (hereinafter abbreviated MAC) of the second layer provides a service to a radio link control layer, which is an upper layer, via a logical channel. The radio link control layer (hereinafter abbreviated RLC) of the second layer supports a reliable data transport. And, a function of the RLC layer can be implemented with a function block within the MAC layer. In this case, the RLC layer may not exist. A PDCP layer of the second layer performs a header compression function for reducing an IP packet header size, which is relatively big and carries unnecessary control information, to efficiently transmit such an IP packet as IPv4, IPv6 and the like in a radio section having a narrow bandwidth.

A radio resource control (hereinafter abbreviated RRC) layer situated at the top of the third layer is defined in a control plane only. The RRC layer is responsible for controlling logical channels, transport channels and physical channels in association with configuration, reconfiguration and release of radio bearers (hereinafter abbreviated RBs). In this case, the RB means a service provided by the second layer for the data delivery between the UE and the E-UTRAN. In case that an RRC connection is established between the RRC layer of the UE and the RRC layer of the E-UTRAN, the UE is in an RRC connected sate (RRC_CONNECTED). Otherwise, the UE is in an RRC idle state (RRC_IDLE).

Downlink transport channels for transporting data to a user equipment from a network may include a broadcast channel (BCH) for transporting system information and a downlink shared channel (SCH) for transmitting user traffic, control message and/or the like. Traffic or control message of a downlink multicast or broadcast service may be transmitted on the downlink SCH or a separate downlink multicast channel (MCH). Meanwhile, uplink transport channels for transporting data to a network from a user equipment may include a random access channel (RACH) for transmitting an initial control message and an uplink shared channel (SCH) for transmitting user traffic, control message and/or the like.

Logical channel, which is situated above the transport channel to be mapped thereto, may include one of BCCH (Broadcast Channel), PCCH (Paging Control Channel), CCCH (Common Control Channel), MCCH (Multicast Control Channel), MTCH (Multicast Traffic Channel) and the like.

Physical channel consists of several subframes on time axis and several subcarriers on frequency axis. In particular, one subframe consists of a plurality of symbols on time axis. One subframe consists of a plurality of resource blocks. And, one resource block consists of a plurality of symbols and a plurality of subcarriers. Each subframe may be able to use specific subcarriers of specific symbols (e.g., $1^{st}$ symbol) of a corresponding subframe for PDCCH (physical downlink control channel) i.e., L1/L2 control channel. On subframe may consist of 2 slots each of which has a length of 0.5 ms, which may amount to 1 ms corresponding to TTI (transmission time interval) as a unit time for transmitting data.

In the following description, an RRC state of a user equipment and an RRC connection method are explained.

First of all, the RRC state means whether an RRC of a user equipment has a logical connection with an RRC of E-UTRAN. If the RRCs are connected with each other, it is called RRC_CONNECTED state. If the RRCs are not connected with each other, it is called RRC_IDLE state. Since RRC connection exists in a user equipment in RRC_CONNECTED state, E-UTRAN is able to recognize a presence of the corresponding user equipment. Hence, the E-UTRAN is able to effectively control the user equipment. On the contrary, E-UTRAN is unable to recognize a user equipment in RRC_IDLE state. And, this user equipment is managed by a core network by a tracking area unit which is a unit of an area larger than a cell. In particular, a presence or non-presence of a user equipment in RRC_IDLE state is recognizable by a larger area unit and should enter RRC_CONNECTED state to receive such a general mobile communication service as a voice service and a data service.

When a user of a user equipment initially turns on a power of the user equipment, the user equipment searches for a suitable cell and then stays in RRC_IDLE state in the corresponding cell. If the user equipment staying in the RRC_IDLE state needs to establish an RRC connection, it establishes the RRC connection with an RRC of E-UTRAN by RRC connection procedure and then enters RRC_CONNECTED state. The user equipment in the idle state may need to establish an RRC connection due to the following reasons. First of all, an uplink data transmission is necessary due to a user's call attempt and the like. Secondly, if a paging message is received from E-UTRAN, it is necessary to send a response message in response to the received paging message.

NAS (non-access stratum) layer situated above RRC layer performs such a function as a session management and a mobility management and the like.

In order for the NAS layer to manage mobility of a user equipment, two kinds of states EMM-REGISTERED (EPS mobility Management-REGISTERED) and EMM-DEREGISTERED. These two states may apply to a user equipment and an MME. A user equipment in an early stage is in RMM-DEREGISTERED state. In order to access a network, this user equipment performs a process for registering with the corresponding network via an initial attach procedure. If the attach procedure is successfully completed, the user equipment and the MME are in EMM-REGISTERED states.

In order to manage a signaling connection between a user equipment and an EPC, two kinds of states ECM-IDLE (EPS connection management) and ECM-CONNECTED are defined. These two states may apply to a user equipment and an MME. If a user equipment in ECM-IDLE state establishes an RRC connection with E-UTRAN, the corresponding user equipment is in ECM-CONNECTED state. If MME in ECM-IDLE establishes S1 connection with E-UTRAN, it the corresponding MME is in ECM-CONNECTED state. When a user equipment is in ECM-IDLE state, E-UTRAN may not have context information of the user equipment. Hence, the user equipment in ECM-IDLE state may perform a UE based mobility related procedure such as a cell selection and a cell reselection without receiving a command given by a network. On the contrary, when a user equipment in ECM-CONNECTED state, mobility of the user equipment is managed y a command of a network. If a location of a user equipment in ECM-IDLE state deviates from a location known to a network, the user equipment informs the network of a corresponding location of the user equipment through a tracking area update procedure.

In the following description, system information is explained.

First of all, system information includes mandatory information that a user equipment should know to access a base station. Hence, the user equipment should receive full system information before accessing the base station and should have latest system information all the time. Since the system information is the information that all user equipments within one cell should know, the base station periodically transmits the system information.

The system information may be divided into MIB, SB, SIB and the like. The MIB (master information block) enables a user equipment to know a physical configuration (e.g., bandwidth, etc.) of a corresponding cell. The SB (scheduling block) indicates transmission information of SIBs, e.g., transmission period and the like. The SIB (system information block) is a set of system informations associated with each other. For instance, one SIB contains information of a neighbor cell only and another SIB contains information on an uplink radio channel used by a user equipment only.

Figure 4:
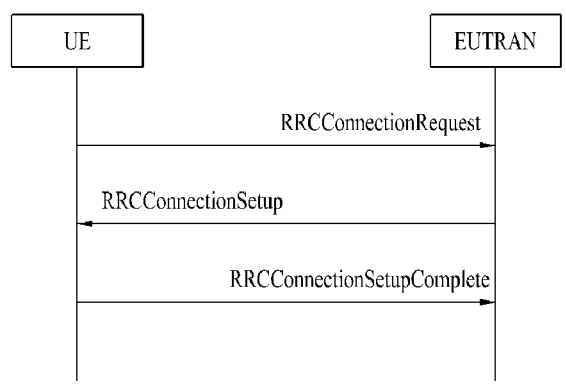
FIG. 4 is a diagram to describe an RRC connection setup.

FIG. 4 is a diagram to describe an RRC connection setup. In the following description, an EEC connection setup procedure is explained with reference to FIG. 4.

Referring to FIG. 4, RRC-IDLE used equipment (UE) having no RRC connection with a base station receives common radio resource configuration parameters, which should be used when a user equipment attempts to establish an RRC connection, via system information of the base station and then applies the received parameters. For instance, the user equipment receives parameters of common configuration of various physical channels, parameters of common configuration of a random access channel and parameters of other physical layers via RadioResourceConfigCommon IE and then applies the received parameters.

The user equipment attempts RRC connection with the base station by applying the common configuration parameters received via the system information. This RRC connection setup procedure is initiated when the user equipment sends an RRC connection request message (RRCConnectionRequest) to the base station. If the base station accepts the RRC connection request message from the user equipment, the base station sends an RRC connection setup message containing SRB1 configuration information to the user equipment. If the user equipment receives the RRC connection setup message from the base station, the user equipment configures SRB1 and then sends an RRC connection setup complete message (RRCConnectionSetupComplete) to the base station to confirm the successful RRC connection setup.

If the RRC connection is successfully established, the user equipment receives configuration related to security from a network. If the security configuration is completed, the user equipment continues the procedure for configuring SRB2 and DRBs so that various resources required for receiving a service from the base station can be configured. In LTE system, a base station uses an RRC connection reconfiguration procedure to configure various radio resources for a user equipment.

Figure 5:
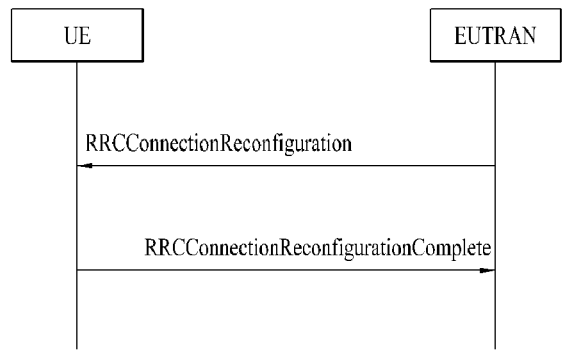
FIG. 5 is a diagram to describe an RRC connection reconfiguration.

FIG. 5 is a diagram to describe a process for an RRC connection reconfiguration.

First of all, an RRC connection reconfiguration process is used for a network to configure (or reconfigure) RRC connection with a user equipment like configuration/modification/removal of RB. This process is used to configure a setup for measurement of a user equipment as well and may be used to support mobility of a user equipment for handover and the like.

Referring to FIG. 5, a base station sends an RRC connection reconfiguration message (RRCConnectionReconfiguration) to a user equipment. Having received the RRC connection reconfiguration message from the base station, the user equipment sends an RRC connection reconfiguration complete message (RRCConnectionReconfigurationComplete) to the base station to confirm the successful RRC connection reconfiguration.

Figure 6:
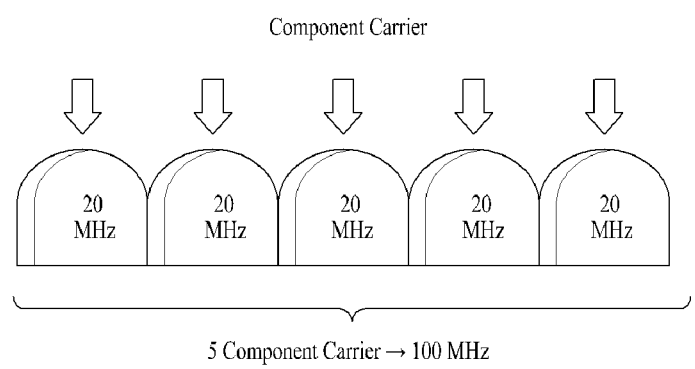
FIG. 6 is a diagram to describe a carrier aggregation technology applied to 3GPP LTE-A system.

FIG. 6 is a diagram to describe a carrier aggregation technology applied to 3GPP LTE-A system.

LTE-A technology standard is IMT-Advanced candidate technology of ITU (international telecommunication union) and is designed to coincide with IMT-Advanced technology requirements. Hence, in order to satisfy the requirements of ITU, the ongoing discussion on extending a bandwidth wider than that of a legacy LTE system is made by LTE-A.

In order to extend a bandwidth in LTE-A system, a carrier of a legacy LTE system is defined as a component carrier (hereinafter abbreviated CC) and maximum 5 component carriers are combined to be used in the ongoing discussion. Since CC may be able to have a maximum bandwidth of 20 MHz like the LTE system, a bandwidth may be conceptionally extensible up to maximum 100 MHz. Thus, the technique of using a plurality of component carriers (CCs) by combining them together is called carrier aggregation (hereinafter abbreviated CA).

Figure 7:
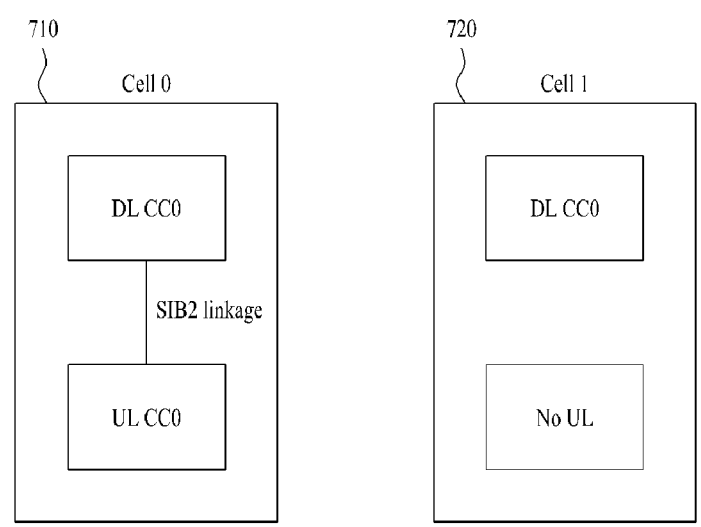
FIG. 7 is a diagram to describe definition of a cell in aspect of a user equipment in case of applying a carrier aggregation technology.

FIG. 7 is a diagram to describe definition of a cell in aspect of a user equipment in case of applying a carrier aggregation technology.

Referring to FIG. 7, if the CA mentioned in the foregoing description is applied, a plurality of CCs may be included for each of downlink (hereinafter abbreviated DL) and uplink (hereinafter abbreviated UL). In this system, a combination 710 of DL CC and UL CC (e.g., cell 0 shown in FIG. 7) or a DLL CC (e.g., cell 1 shown in FIG. 7) 720 only may be regarded as a cell in aspect of a user equipment. Referring to FIG. 7, a linkage relation between DL CC and UL CC may be indicated via system information carried on DL resource. In particular, system information of a CA applied mobile communication system contains information on a linkage relation between UL CC and DL CC in addition to the aforementioned system information, which is illustrated as SIB2 linkage in FIG. 7.

When a discussion on a radio resource used by a user equipment is made in logical aspect, if the user equipment has a serving cell, configuring CC for the user equipment additionally may be almost similar to configuring a cell available for the user equipment in addition to the serving cell. In particular, configuring a plurality of CCs for a user equipment may be logically similar to configuring a plurality of cells for the user equipment.

In order to use a component carrier, a user equipment should receive information on configuration of the component carrier from a base station. Component carrier configuration information includes partial system information of the component carrier and values of parameters related to other various component carrier operations. LTE-A system uses the above-described RRC connection reconfiguration procedure in order to additionally configure component carrier for a user equipment.

When a network attempts to add a component carrier to a user equipment, if a network delivers full component carrier configuration information, which is required for the component carrier to operate, to the user equipment in a manner that the corresponding component carrier configuration information is included in an EEC connection reconfiguration message, the user equipment may additionally configure the component carrier in accordance with the received component carrier configuration information.

Moreover, component carrier modification (CC modification) or component carrier removal (CC removal) is performed by the RRC connection reconfiguration procedure as well as the component carrier addition (CC addition).

Based on the above description, a method of managing component carrier configuration information is explained as follows.

First of all, if a user equipment receives information required for component carrier configuration, the user equipment stores the received component carrier configuration information. Thereafter, if the user equipment receives a component carrier configuration (addition) command failing to include information sufficient for the component carrier configuration or operation, the user equipment configures (or adds) component carrier by means of utilizing the previously stored component carrier configuration information.

Operations of the user equipment are described in detail as follows.

Figure 8:
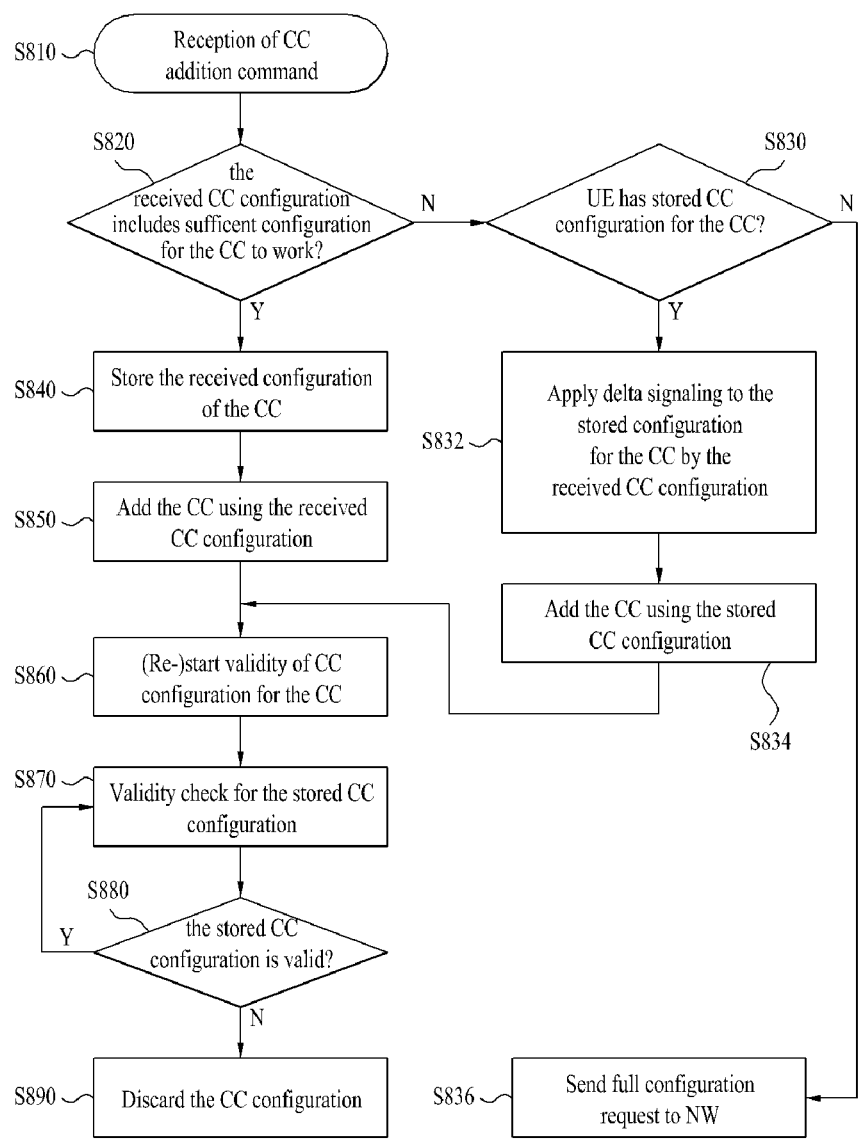
FIG. 8 is a diagram for an operation of a user equipment that receives a component carrier addition command.

FIG. 8 is a diagram for an operation of a user equipment that receives a component carrier addition command.

Referring to FIG. 8, a user equipment receives a component carrier configuration (e.g., CC addition) command [S810].

The user equipment determines whether the received component carrier configuration command includes component carrier configuration information sufficient for a component carrier to operate [S820]. If the received component carrier configuration command includes full component carrier configuration information sufficient for the component carrier to operate by being configured for the user equipment, the user equipment may perform a series of the following operations or steps [S840 to S890].

In particular, the user equipment stores the received component carrier configuration information [S840]. Subsequently, the user equipment adds a corresponding component carrier to a component carrier list set for the user equipment in accordance with the received component carrier configuration [S850].

The user equipment sets up a time for expiration of validity of the stored component carrier configuration for the component carrier [S860]. In this case, a value of the time of the expiration of the component carrier configuration may include a value previously set within the user equipment or a value set up by the network.

The user equipment keeps checking whether the validity of the stored component carrier configuration expires [S870, S880]. If the validity expires according to the validity check, the user equipment deletes the stored component carrier configuration information [S890].

In doing so, the validity of the component carrier configuration may be independently managed for each component carrier configured for the user equipment. Moreover, the validity of the component carrier configuration may be managed in a manner of operating a timer independent for each component carrier.

Meanwhile, the validity of the component carrier configuration information may be determined in accordance with version information of the component carrier configuration information of each component carrier. In particular, after a version of the component carrier configuration information received from the network has been compared to a version of the component carrier configuration information stored in the user equipment, if the version of the newly received component carrier configuration information is newer than that of the component carrier configuration information previously stored in the user equipment, the component carrier configuration information is changed into a latest version and the latest version of the component carrier configuration information can be then stored.

Referring now to FIG. 8, after the user equipment has received the component carrier configuration (e.g., CC addition) command [S810], if the received component carrier configuration command is determined as not including the full component carrier configuration required for the component carrier to operate by being configured for the user equipment [S820], the user equipment may perform a series of the following operations or steps [S830 to S834].

In particular, for the component carrier indicated by the component carrier addition command, the user equipment checks whether a stored component carrier configuration information exists [S830].

In this case, the component carrier addition command may include minimum component carrier identification information. This component carrier identification information may include a frequency and a physical cell identifier (PCI) and the like. Though the comparison between the received component carrier identification information and the component carrier identification information in the component carrier configuration information stored in the user equipment, the user equipment may check a presence or non-presence of the component carrier configuration information stored in the user equipment.

If the user equipment has the stored component carrier configuration information for the corresponding component carrier, the user equipment may reconfigure the stored component carrier configuration information in a manner of overwriting the received component carrier configuration information based on the stored component carrier configuration information [S832].

In doing so, the user equipment maintains the stored component carrier configuration information for other component carrier configurations except the component carrier configuration received on overwriting the component carrier configuration information and substitutes the stored component carrier configuration information with the received information for the received component carrier configuration only.

And, the user equipment adds the corresponding component carrier to the component carrier list set for the user equipment in accordance with the stored component carrier configuration information [S834].

On the contrary, if the user equipment does not have the component carrier configuration information stored for the corresponding component carrier in the step S830, the user equipment determines as unable to add a component carrier using any one of the received component carrier configuration information and the stored component carrier configuration information and then makes a request for full component carrier configuration information for the component carrier addition to the network [S836].

Figure 9:
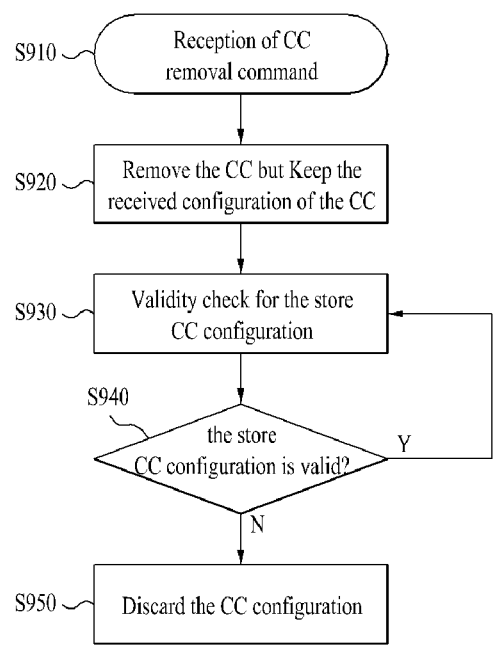
FIG. 9 is a diagram for a series of operations in saving a component carrier configuration information when a user equipment receives a component carrier removal command.

FIG. 9 is a diagram for a series of operations in saving a component carrier configuration information when a user equipment receives a component carrier removal command.

Referring to FIG. 9, a user equipment receives a component carrier removal command [S910]. If the component carrier removal command is received, the user equipment may perform a series of operations or steps S920 to S950 shown in FIG. 9.

In response to the component carrier removal command, the user equipment removes a corresponding component carrier from an available component carrier list. In doing so, the user equipment does not delete a component carrier configuration information stored for the corresponding component carrier but maintains the stored component carrier configuration information despite removing the corresponding component carrier.

For the maintained component carrier configuration information, the user equipment keeps checking whether the validity of the stored component carrier configuration is maintained [S930, S940]. In particular, the user equipment maintains the corresponding information until the validity of the component carrier configuration information for the corresponding component carrier expires.

If the validity of the component carrier configuration expires, the user equipment deletes the stored configuration information of the corresponding component carrier [S950].

Figure 10:
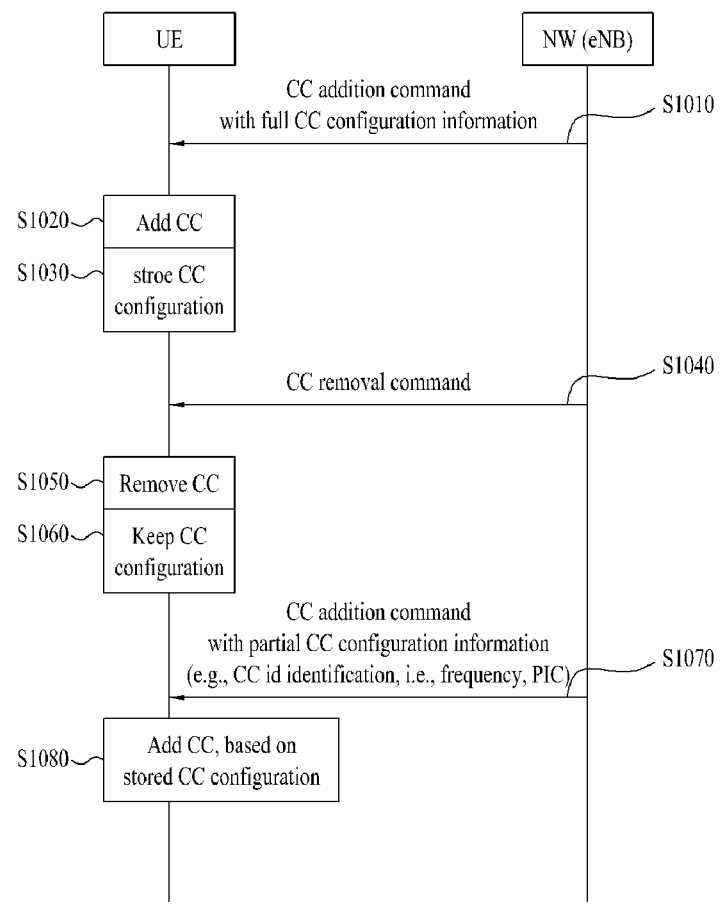
FIG. 10 is a diagram for a signaling between a user equipment and a network and a user equipment operation according to the present invention.

FIG. 10 is a diagram for a signaling between a user equipment and a network and a user equipment operation according to the present invention.

FIG. 10 shows one example of a signaling between a user equipment and a network and a user equipment operation. According to the present example, the user equipment follows the user equipment operations described with reference to FIG. 8 and FIG. 9. This is described in detail as follows.

Referring to FIG. 10, a user equipment receives a component carrier addition command from a network [S1010]. If the component carrier addition command includes full configuration information required for a component carrier to operate, the corresponding component carrier is regarded as an available component carrier in accordance with this component carrier configuration information.

The user equipment adds the component carrier using the component carrier configuration information in response to the reception of the component carrier addition command [S1020].

Subsequently, the user equipment stores the component carrier configuration information on the corresponding component carrier [S1030].

Thereafter, the user equipment receives a command for removal of the corresponding component carrier from the network [S1040].

The user equipment removes the corresponding component carrier from the available component carriers in response to the reception of the component carrier removal command [S1050].

Yet, the user equipment does not delete the component carrier configuration information on the corresponding component carrier but maintains the corresponding component carrier configuration information [S1060].

Thereafter, the user equipment receives a corresponding component carrier addition command [S1070]. In this case, the corresponding component carrier addition command may have partial information (e.g., component carrier identification information (e.g., frequency, PCI, etc.)) only instead of the full component carrier configuration information required for a component carrier operation.

If the component carrier addition command does not include the full configuration information required for the component carrier operation, the user equipment adds a component carrier using the stored component carrier configuration information [S1080].

In the following description, a user equipment device and a base station device for performing the component carrier configuration information managing method according to another embodiment of the present invention are explained.

Figure 11:
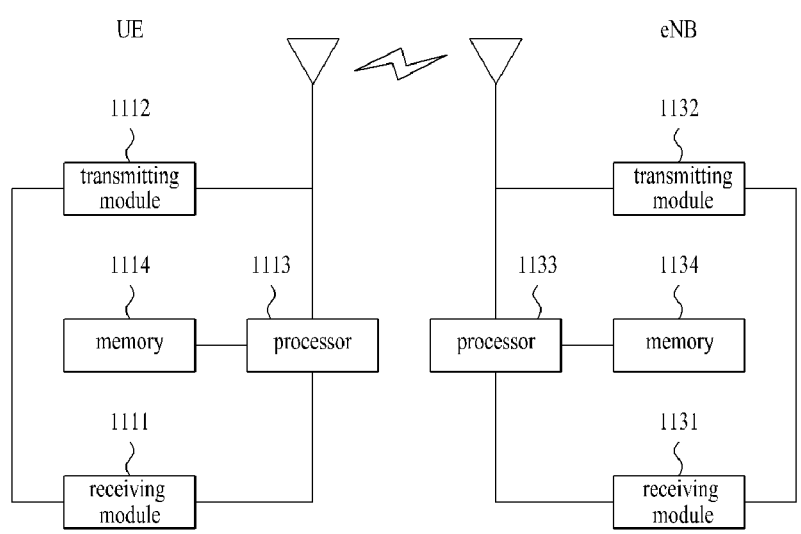
FIG. 11 is a diagram for a configuration of a wireless communication system including a user equipment device and a base station device according to an embodiment of the present invention.

FIG. 11 is a diagram for a configuration of a wireless communication system including a user equipment device and a base station device according to an embodiment of the present invention.

Referring to FIG. 11, a user equipment (UE) device may include a receiving module 1111, a transmitting module 1112, a processor 1113 and a memory 1114. The receiving module 1111 may be able to receive various signals, data, information and the like from a base station and the like. The transmitting module 1112 may be able to transmit various signals, data, information and the like to the base station and the like. And, the memory 1114 may be able to store component carrier configuration information on each of a plurality of component carriers (CCs).

Moreover, the receiving module 1111 may be able to receive the aforementioned component carrier configuration information for the component carrier configuration/addition or such a command as a component carrier removal command, a component carrier addition command and the like.

The processor 1113 may be able to performs various kinds of component carrier configuration information managing operations through the component carrier configuration information, the component carrier removal command, the component carrier addition command and the like, which are received via the receiving module 1111. In particular, in case of receiving the component carrier removal command, the processor 1113 may be able to remove the corresponding component carrier while maintaining the corresponding component carrier configuration information intact. The processor 1113 may determine validity of the component carrier configuration information. If the component carrier configuration information is not valid, the processor 1113 may be able to remove the corresponding component carrier configuration information. If the processor 1113 receives the component carrier addition command, the processor 1113 may be able to control all operations for adding the corresponding component carrier using the corresponding component carrier configuration information.

Meanwhile, a base station (eNB) device may include a receiving module 1131, a transmitting module 1132, a processor 1133 and a memory 1134. The receiving module 1131 may be able to receive various signals, data, information and the like from a user equipment and the like. The transmitting module 1132 may be able to transmit various signals, data, information and the like to the user equipment and the like.

The processor 1133 may control the transmitting module 1132 to transmit configuration information on a specific one of a plurality of CCs to the user equipment. And, the processor 1133 may be able to manage mobility of the corresponding user equipment via a measurement reporting message received by the receiving module 1131 from the user equipment. The processor 1133 may perform a function of operation processing of information received from the user equipment, information to be externally transmitted and the like. The memory 1134 may be able to store the operation processed information and the like for prescribed duration and may be substituted with such a component as a buffer (not shown in the drawing) and the like.

Regarding the above description, a user equipment may be able to determine validity of component carrier configuration information. Hence, if the validity expires, it may be able to delete the component carrier configuration information. Even if the component carrier configuration information is deleted in accordance with the validity check, the user equipment may be able to receive a component carrier addition command for a corresponding component carrier from a base station. If the component carrier addition command includes component carrier configuration information sufficient for component carrier addition, it may be able to add a component carrier using the corresponding component carrier configuration information. On the contrary, if the component carrier addition command does not include component carrier configuration information sufficient for component carrier addition, the user equipment may be able to send a message for requesting component carrier configuration information to the base station. If the base station transmits the component carrier configuration information in response to the request message from the user equipment, the user equipment may be able to add a component carrier using the corresponding component carrier configuration information.

In the following description, regarding the above-described component carrier configuration information managing method, the component carrier is explained using sCell (secondary cell) only.

First of all, a user equipment receives sCell removal command message (e.g., sCellToReleaseList) from a network. Through sCellIndex contained in the sCell removal command message (e.g., sCellToReleaseList), the user equipment determines a presence or non-presence of sCell having the corresponding sCellIndex. If the sCell having the corresponding sCellIndex is present, the user equipment removes the corresponding sCell. In doing so, the user equipment maintains configuration information on the sCell despite removing the sCell. Hence, if a following sCell is added/modified, it may be unnecessary to receive sCell configuration information separately. Through this, it may be able to save radio resources.

Thereafter, the user equipment receives sCell addition/modification command message (e.g., sCellToAddMoList) for the same sCell from a network. If the corresponding sCell does not exist in the user equipment currently as a result of determination via sCellIndex contained in the sCell addition/modification command message, the corresponding sCell is added [sCell addition].

In case of the sCell addition, the sCell is added to correspond to cell identification (cellIdentification) in accordance with the received sCell configuration information (radioResourceConfigCommon and radioResourceConfigDedicated).

Meanwhile, regarding the sCell addition according to the present invention, the user equipment may be able to store the sCell configuration information. Hence, even if the sCell addition/modification command message does not include sCell configuration information sufficient for the sCell addition, it may be able to add sCell using the sCell configuration information stored in the user equipment. In particular, since the user equipment of the present invention is able to maintain the configuration information on the sCell intact despite that the sCell is deleted, in case that an addition command for the same sCell is received, it may be able to add sCell using the previously stored configuration information without receiving the corresponding sCell configuration information separately.

When the determination is made via the sCellIndex included in the sCell addition/modification command message (sCellToAddModList), if the corresponding sCell corresponds to a current user equipment configuration, the corresponding sCell is modified [sCell Modification]. In the sCell modification, it may be able to modify the sCell configuration in accordance with the received configuration information (radioResourceConfigDedicated).

Meanwhile, a configuration of the processor, which becomes a core of each of the configurations of the user equipment and base station, is described in detail as follows.

Figure 12:
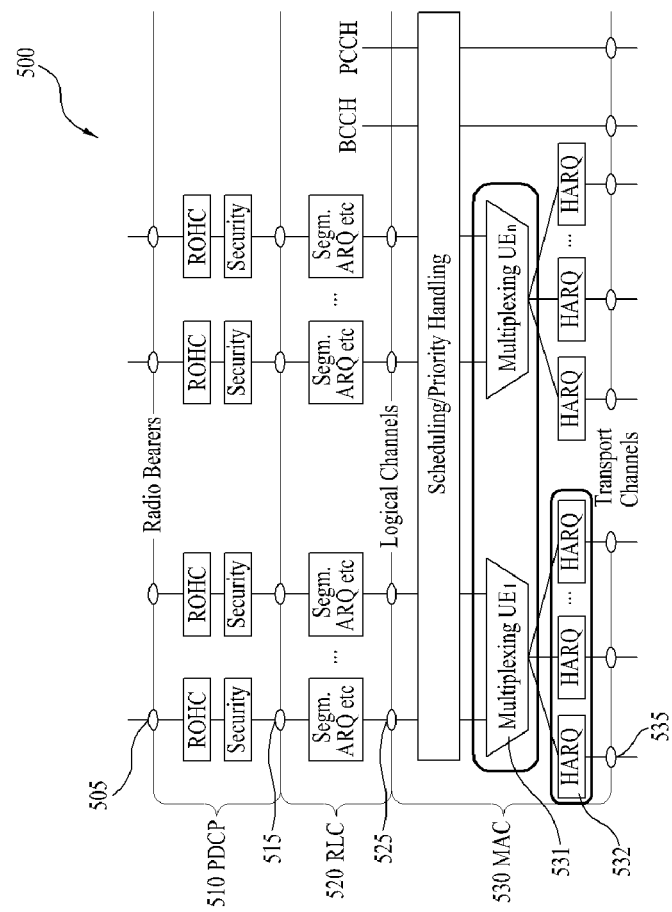
FIG. 12 is a diagram for a processor function of a base station, and more particularly, for a structure of L2 layer ($2^{nd}$ layer) to which embodiments of the present invention are applied.
Figure 13:
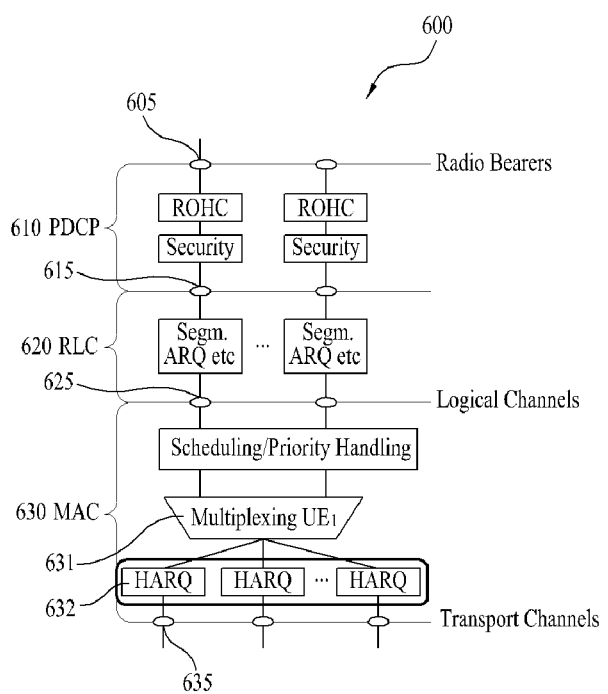
FIG. 13 is a diagram for a processor function of a user equipment, and more particularly, for a structure of L2 layer ($2^{nd}$ layer) to which embodiments of the present invention are applied.

FIG. 12 is a diagram for a processor function of a base station, and more particularly, for a structure of L2 layer ($2^{nd}$ layer) to which embodiments of the present invention are applied, and FIG. 13 is a diagram for a processor function of a user equipment, and more particularly, for a structure of L2 layer ($2^{nd}$ layer) to which embodiments of the present invention are applied.

In a DL L2 structure 500 shown in FIG. 12, layers of PDCP 510, RLC 520 and MAC 530 are represented. In FIG. 12, elements 505, 515, 525 and 535 provided to interfaces between the layers indicate service access points (SAP) for peer-to-peer communications. The SAP between PHY channel (not shown in the drawing) and the MAC layer provides a transport channel [535]. And, the SAP between the MAC layer and the RLC layer provides a logical channel [525]. General operations of the respective layers are as good as mentioned in the foregoing description.

The MAC layer multiplexes a plurality of logical channels (i.e., radio bearers) from the RLC layer. In the DL L2 structure, a plurality of multiplexing entities 531 of the MAC layer are related to the application of MIMO (multiple input multiple output) technology. Since one transport channel is generated by multiplexing a plurality of logical channels in case of non-MIMO in a system that does not consider carrier aggregation technology, one HARQ (hybrid automatic repeat and request) entity is provided to one multiplexing entity 531 [not shown in the drawing].

On the other hand, in a base station processor that considers carrier aggregation technology, a plurality of transport channels corresponding to a plurality of component carriers are generated from one multiplexing entity 531. Regarding this, in the carrier aggregation (CA) technology, one HARQ entity 532 manages one component carrier. Hence, the MAC layer 530 of the base station processor, which supports the carrier aggregation technology, provides one multiplexing entity 531 with a plurality of HARQ entities 532 and performs operations related to them. Since each of the HARQ entities 532 handles a transport block independently, a plurality of transport blocks may be simultaneously transmitted/received via a plurality of component carriers.

The UL L2 structure 600 shown in FIG. 13 (i.e., the processor L2 structure of the user equipment) performs the same operations of the DL L2 structure 500 shown in FIG. 12 except that one multiplexing entity 630 is included in one MAC layer 630. In particular, a plurality of HARQ entities 632 are provided for a plurality of component carriers, operations related to a plurality of the HARQ entities 632 are performed in the MAC layer 630, and a plurality of transport blocks can be simultaneously transmitted/received via a plurality of the component carriers.

The embodiments of the present invention mentioned in the foregoing description may be implemented using various means. For instance, embodiments of the present invention can be implemented using hardware, firmware, software and/or any combinations thereof.

In the implementation by hardware, a method according to each embodiment of the present invention may be implemented by at least one selected from ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the embodiments of the present invention mentioned in the foregoing description are mainly explained in case of being applied to 3GPP LTE based mobile communication system for clarity, they may be applicable in the same manner to various kinds of mobile communication systems in which a user equipment is able to simultaneously use a plurality of component carriers (CC) using a measurement operation for the mobility management of the user equipment.

What is claimed is:

1. A method of managing component carrier (CC) configuration information in a user equipment (UE) that supports carrier aggregation, the method comprising:
   receiving first CC configuration information from a network, the information related to a first CC among a plurality of CCs configured in the UE;
   storing the received first CC configuration information;
   starting a first CC-specific timer related to validity of the received first CC configuration information;
   receiving a CC removal command related to the first CC from the network;
   removing the first CC from a CC list according to the received CC removal command while maintaining and storing the first CC configuration information if the first CC-specific timer has not expired;
   receiving a CC addition command related to the first CC from the network, the CC addition command including second CC configuration information; and
   adding the first CC and the second CC to the CC list according to the CC addition command,
   wherein adding the first CC and the second CC comprises:
      determining whether to use the previously stored first CC configuration information or to request new first CC configuration information from the network when the CC addition command does not include the first CC configuration information, the determination based on the first CC-specific timer;
      adding the first CC based on a result of the determination; and
      adding the second CC by using the second CC configuration information regardless of whether the second CC configuration information is stored in the UE,
   wherein the first CC-specific timer and the second CC-specific timer are controlled separately,
   wherein a value of the first CC-specific timer and a value of the second CC-specific timer are the same, and
   wherein the first CC-specific timer is restarted when the CC addition command contains the previously stored first CC configuration information.

2. The method of claim 1, further comprising:
   determining whether the stored first CC information is valid based on an expiration of the first CC-specific timer;
   maintaining the stored CC configuration information if the stored CC configuration information is valid; and
   deleting the first CC configuration information if the stored first CC configuration information is not valid.

3. The method of claim 1, further comprising configuring the value of the first CC-specific timer and the second CC-specific timer based on system information broadcast by the network.

4. The method of claim 1, wherein the first CC and the second CC further comprises:
   adding the first CC to the CC list based on the first CC configuration information if the CC addition command includes the first CC configuration information.

5. The method of claim 1, wherein the first CC configuration information comprises system information related to the first CC and a parameter required for operation of the first CC.

6. A user equipment (UE) that manages component carrier (CC) configuration information and supports carrier aggregation, the UE comprising:
   a receiving module configured to receive first CC configuration information from a network, the information related to a first CC among a plurality of CCs configured in the UE and to receive CC removal command related to the first CC and a CC addition command related to the first CC and a second CC, the CC addition command including second CC configuration information;
   a memory configured to store the received first CC configuration information; and
   a processor configured to:
   control the receiving module to receive and the memory to store the received first CC configuration information;
   start a first CC-specific timer related to validity of the received first CC configuration information;

remove the first CC from a CC list according to the received CC removal command while maintaining and storing the first CC configuration information if the CC-specific timer has not expired; and add the first CC and the second CC to the CC list according to the CC addition command wherein adding the first CC and the second CC comprises:
determining whether to use the previously stored first CC configuration information or to request new first CC configuration information from the network when the CC addition command does not include the first CC configuration information, the determination based on the first CC-specific timer;

adding the first CC based on a result of the determination; and adding the second CC using the second CC configuration information regardless of whether the second CC configuration information is stored in the UE, wherein the first CC-specific timer and the second CC-specific timer are controlled separately, wherein a value of the first CC-specific timer and a value of the second CC-specific timer are the same, and wherein the first CC-specific timer is restarted when the CC addition command contains the previously stored first CC configuration information.

7. The user equipment of claim 6, wherein the processor is further configured to:
determine whether the stored first CC configuration information is valid based on an expiration of the first CC-specific timer;
control the memory to maintain the stored first CC configuration information if the stored first CC configuration information is valid; and
control the memory to delete the first CC configuration information if the stored first CC configuration information is not valid.

8. The user equipment of claim 6, wherein adding the first CC and the second CC further comprises:
adding the first CC to the CC list based on the first CC configuration information if the CC addition command includes the first CC configuration information.

9. The user equipment of claim 6, wherein the processor is further configured to configure the value of the first CC-specific timer and the second CC-specific timer based on system information broadcast by the network.

10. The user equipment of claim 6, wherein the first CC configuration information comprises system information related to the first CC and a parameter required for operation of the first CC.

* * * * *